(12) United States Patent
Choi et al.

(10) Patent No.: US 7,564,219 B2
(45) Date of Patent: Jul. 21, 2009

(54) CHARGING CONTROLLER FOR PERFORMING CONSTANT CURRENT AND VOLTAGE MODES

(75) Inventors: Jong-Sang Choi, Seoul (KR); Jin-Kug Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 11/715,576

(22) Filed: Mar. 8, 2007

(65) Prior Publication Data

US 2007/0210756 A1  Sep. 13, 2007

(30) Foreign Application Priority Data

Mar. 8, 2006  (KR) .................... 10-2006-0021955

(51) Int. Cl.
*H01M 10/46* (2006.01)
(52) U.S. Cl. .................................................. 320/128
(58) Field of Classification Search ............... 320/107, 320/128, 134, 136, 160
See application file for complete search history.

(56) References Cited

U.S. PATENT DOCUMENTS

| 6,064,184 A | 5/2000 | Tamai ........................ 320/134 |
| 6,281,730 B1 * | 8/2001 | Vu .............................. 327/170 |
| 6,570,372 B2 | 5/2003 | Barcelo et al. .............. 323/316 |

OTHER PUBLICATIONS

Japanese Patent Application No. 2001-287039 to Junji, having Publication date of Mar. 28, 2003 (w/English Abstract page).

* cited by examiner

*Primary Examiner*—Edward Tso
(74) *Attorney, Agent, or Firm*—Monica H. Choi (57) ABSTRACT

A charging controller includes a control node having a control voltage generated thereon for controlling a first current to a charged device and a second current to a reference device. Feedback loops are formed with amplifiers and a pull-up current source and control transistors, or with amplifiers and transfer transistors, for maintaining the second current at a constant current level during a constant current mode and for maintaining a voltage of the charged device at a constant voltage level during a constant voltage mode. Use of a pull-down current source at the control node is avoided for preventing damage to the charged device.

21 Claims, 11 Drawing Sheets

CHARGING CONTROLLER FOR PERFORMING CONSTANT CURRENT AND VOLTAGE MODES

BACKGROUND OF THE INVENTION

This application claims priority under 35 USC § 119 to Korean Patent Application No. 2006-21955, filed on Mar. 8, 2006 in the Korean Intellectual Property Office, the disclosure of which is incorporated herein in its entirety by reference.

1. Field of the Invention

The present invention relates generally to chargers such as battery chargers, and more particularly, to a charging controller that maintains a charging voltage to be constant during a constant voltage mode.

2. Background of the Invention

As use of portable electronic devices, such as cellular phones, personal digital assistants (PDAs), portable multimedia players (PMPs), etc., increases, various techniques for charging batteries safely and efficiently are being developed. In portable electronic devices, secondary batteries, which can be re-charged when discharged, such as lithium ion batteries, are used.

Figure 1:
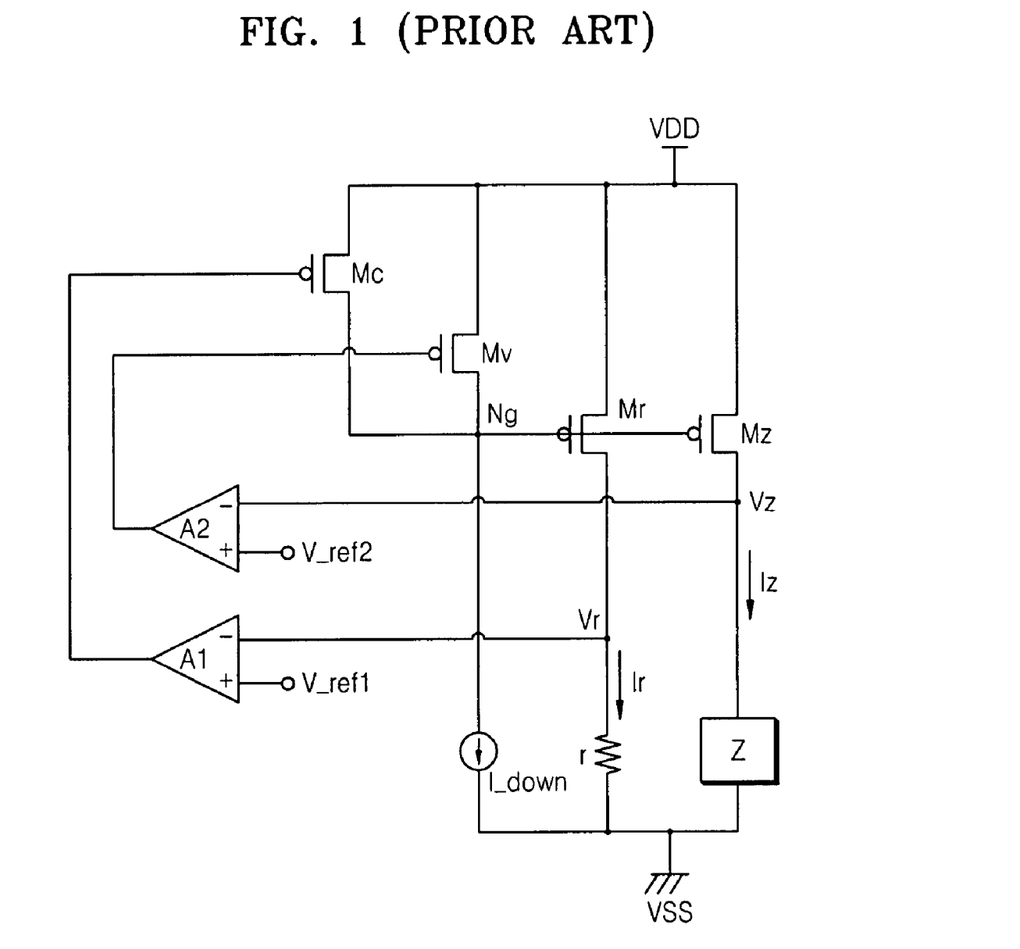
FIG. 1 is a circuit diagram of a conventional charging controller.

FIG. 1 is a circuit diagram of a conventional charging controller for charging a charged device Z which may be a battery. Referring to FIG. 1, the conventional charging controller includes power transistors Mz and Mr and a programmable resistor r. The power transistor Mz is connected between a high voltage supply VDD and the charged device Z for providing a charging current Iz to the charged device Z. The power transistor Mr is connected between the high voltage supply VDD and the resistor r for providing a mirror current Ir to the resistor r. The gates of the power transistors Mr and Mz are connected to a control node Ng.

In addition, the conventional charging controller of FIG. 1 includes a pull-down current source I_down inserted between the control node Ng and a low voltage supply VSS. The conventional charging controller of FIG. 1 also includes a first amplifier A1, a second amplifier A2, a first control transistor Mc, and a second control transistor Mv. The first and second control transistors Mc and Mv are each connected between the high voltage supply VDD and the control node Ng.

The first amplifier A1 amplifies a difference of a first reference voltage V_ref1 and a voltage Vr at the resistor r. The output of the first amplifier A1 is applied on a gate of the first control transistor Mc. The second amplifier A2 amplifies a difference of a second reference voltage V_ref2 and a voltage Vz at the device Z. The output of the second amplifier A2 is applied on a gate of the second control transistor Mv.

Figure 2A:
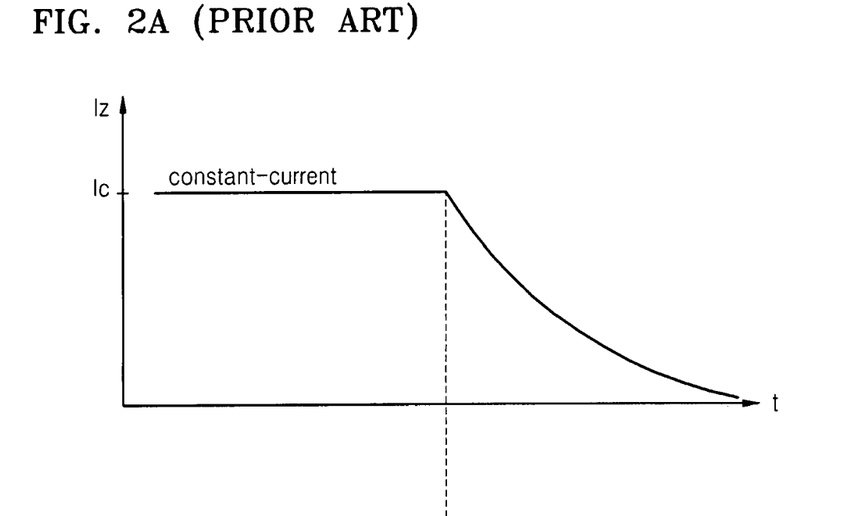
Figure 2B:
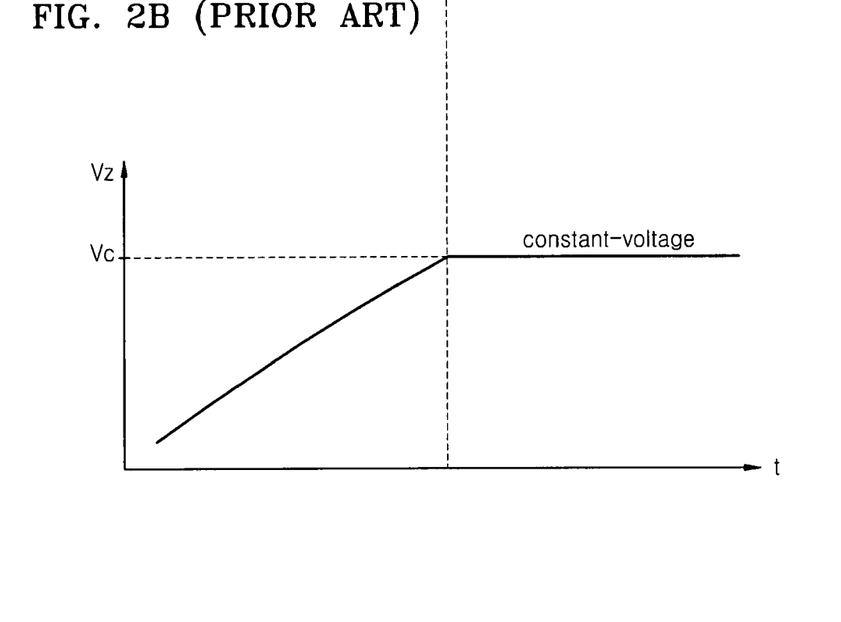
FIG. 2B is a graph of charging voltage versus charging time, for illustrating constant current mode and constant voltage mode in the charging controller of FIG. 1.

The conventional charging controller of FIG. 1 charges the device Z while operating in a constant current mode and a constant voltage mode as shown in FIGS. 2A and 2B, respectively. FIG. 2A is a graph of Iz versus charging time when the charging controller of FIG. 1 operates in the constant current mode. FIG. 2B is a graph of the voltage Vz at the device Z versus charging time when the charging controller of FIG. 1 operates in the constant voltage mode.

The charging controller of FIG. 1 first operates in the constant current mode for charging the device Z that is initially discharged. The voltage Vz at the device Z is lower than the second reference voltage V_ref2 during an initial charging period. Thus, the second amplifier A2 outputs a high level voltage such that the second transistor Mv is turned off during such an initial charging period (i.e., during the constant-current mode).

The level of the mirror current Ir and the level of the charging current Iz may be regulated to be the same or proportional by design of size dimensions of the power transistors Mr and Mz. When the levels of the currents Ir and Iz are so regulated, the voltage Vr corresponds to the level of the charging current Iz. The first amplifier A1 is used for feed-back control of the level of the charging current Iz to be constant (Ic in FIG. 2A) during the constant current mode.

When the charging voltage Vz at the device Z reaches the level of the second reference voltage V_ref2, the constant current mode is ended and the constant voltage mode begins. In that case, the charging current Iz is slowly decreased as shown in FIG. 2A. In the constant voltage mode, the voltage Vr corresponding to the charging current Iz is lower than the first reference voltage V_ref1. Thus, the first amplifier A1 outputs a high level voltage such that the first control transistor Mc is turned off.

The second amplifier A2 is used for feed-back control of the charging voltage Vz to be constant (Vc in FIG. 2B) during the constant voltage mode. That is, the second amplifier A2 controls the turning on and turning off of the second control transistor Mv such that the charging voltage Vz is maintained to the level of the second reference voltage V_ref2. When the charging is finally completed, the charging current Iz is desired to become zero, and the charging voltage Vz is maintained to the level of the second reference voltage V_ref2.

The power transistor Mz should be completely turned off when the charging of the device Z is completed. However, the pull-down current source I_down may discharge the control node Ng such that the voltage at the control node Ng may decrease below that of the high voltage supply VDD. In that case, the charging current Iz may be increased from 0 such that the charging voltage Vz continuously increases even after charging of the device Z is completed. Such increased charging voltage Vz may damage the device Z such that charging is not performed safely.

SUMMARY OF THE INVENTION

Accordingly, the present invention ensures substantially zero charging current for maintaining a voltage at the charged device after charging is complete.

A charging controller according to an aspect of the present invention includes a control node, a pull-up current source, and first and second feed-back controlled devices. The control node has a control voltage generated thereon for controlling a first current to a charged device and a second current to a reference device. The pull-up current source provides a charging current to the control node. The first feed-back controlled device is coupled in a current path of the pull-up current source through the control node for maintaining the second current at a constant current level during a constant current mode. The second feed-back controlled device is coupled in the current path of the pull-up current source through the control node for maintaining a voltage of the charged device at a constant voltage level during a constant voltage mode.

In an example embodiment of the present invention, the pull-up current source and the first and second feed-back controlled devices are connected in series between a high voltage supply and a low voltage supply. For example, the pull-up current source is coupled between the high voltage supply and the control node, and the first and second feed-back controlled devices are connected in series between the control node and the low voltage supply.

In another embodiment of the present invention, the charging controller further includes first and second power transistors. The first power transistor is coupled between the high voltage supply and the charged device, and has a gate coupled to the control node for providing the first current to the charged device. The second power transistor is coupled between the high voltage supply and the reference device, and has a gate coupled to the control node for providing the second current to the reference device.

In a further embodiment of the present invention, the first and second feed-back controlled devices are first and second control transistors coupled in series between the control node and the low voltage supply. In that case, the charging controller further includes first and second amplifiers. The first amplifier is for amplifying a difference of a first reference voltage and a voltage at the reference device, with an output of the first amplifier being applied on a gate of the first control transistor. The second amplifier is for amplifying a difference of a second reference voltage and a voltage at the charged device, with an output of the second amplifier being applied on a gate of the second control transistor.

In an example embodiment of the present invention, each of the first and second control transistors is a respective PMOSFET (P-channel metal oxide semiconductor field effect transistor). Alternatively, each of the first and second control transistors is a respective NMOSFET (N-channel metal oxide semiconductor field effect transistor).

In a further embodiment of the present invention, the charging controller further includes two additional control transistors coupled in series between the control node and the low voltage supply and coupled symmetrically to the gates of the first and second control transistors.

In another embodiment of the present invention, the charging controller further includes a third feed-back controlled device coupled in the current path of the pull-up current source through the control node for limiting a temperature at the charged device. For example, the first, second, and third feed-back controlled devices are first, second, and third control transistors coupled in series between the control node and the low voltage supply, and the pull-up current source is coupled between the high voltage supply and the control node. In that case, the charging controller further includes a third amplifier for amplifying a difference of a third reference voltage and a voltage from a temperature sensor for indicating a temperature at the charged device, with an output of the third amplifier being applied on a gate of the third control transistor.

In another embodiment of the present invention, the charging controller further includes a first series of three additional control transistors coupled between the control node and the low voltage supply, and includes a second series of three additional control transistors coupled between the control node and the low voltage supply. The first and second series of the additional control transistors are coupled symmetrically to the gates of the first, second, and third control transistors.

In an example embodiment of the present invention, the charged device is a battery, and the reference device is a resistor.

A charging controller according to another aspect of the present invention includes a control node, first and second amplifiers, and first and second transfer transistors. The control node has a control voltage generated thereon for controlling a first current to a charged device and a second current to a reference device. The first amplifier is for amplifying a difference of a first reference voltage and a voltage at the reference device. The second amplifier is for amplifying a difference of a second reference voltage and a voltage at the charged device. The first transfer transistor transfers an output of the first amplifier to the control node in response to an output of the second amplifier. The second transfer transistor transfers the output of the second amplifier to the control node in response to the output of the first amplifier.

For example, the first transfer transistor is a field effect transistor with a gate coupled to the output of the second amplifier that turns the first transfer transistor on for maintaining the second current at a constant current level during a constant current mode. In addition, the second transfer transistor is also a field effect transistor with a gate coupled to the output of the first amplifier that turns the second transfer transistor on for maintaining a voltage of the charged device at a constant voltage level during a constant voltage mode.

In another embodiment of the present invention, the charging controller includes a first diode-connected field effect transistor coupled between the output of the first amplifier and the control node, and includes a second diode-connected field effect transistor coupled between the output of the second amplifier and the control node.

In a further embodiment of the present invention, the charging controller further includes a third amplifier for amplifying a difference of a third reference voltage and a voltage from a temperature sensor for indicating a temperature at the charged device. In addition, third and fourth transfer transistors are coupled in series between an output of the third amplifier and the control node. The third and fourth transfer transistors transfer the output of the third amplifier to the control node in response to the outputs of the first and second amplifiers.

Furthermore, a fifth transfer transistor is coupled in series with the first transfer transistor between the output of the first amplifier and the control node. The first and fifth transfer transistors transfer the output of the first amplifier to the control node in response to the outputs of the second and third amplifiers. Also, a sixth transfer transistor is coupled in series with the second transfer transistor between the output of the second amplifier and the control node. The second and sixth transfer transistors transfer the output of the second amplifier to the control node in response to the outputs of the first and third amplifiers.

In this manner, because a pull-down current source is not coupled to the control node, the charging current to the charged device is maintained to be substantially zero during the constant voltage mode. Thus, the voltage at the charged device is not increased after the charged device is completely charged for preventing damage to the charged device.

BRIEF DESCRIPTION OF THE DRAWINGS

The above and other features and advantages of the present invention will become more apparent when described in detailed exemplary embodiments thereof with reference to the attached drawings in which:

FIG. 2A is a graph of charging current versus charging time.

The figures referred to herein are drawn for clarity of illustration and are not necessarily drawn to scale. Elements having the same reference number in FIGS. 1, 2A, 2B, 3A, 3B, 3C, 4A, 4B, 4C, 5A, 5B, and 6 refer to elements having similar structure and/or function.

DETAILED DESCRIPTION OF THE INVENTION

Figure 3A:
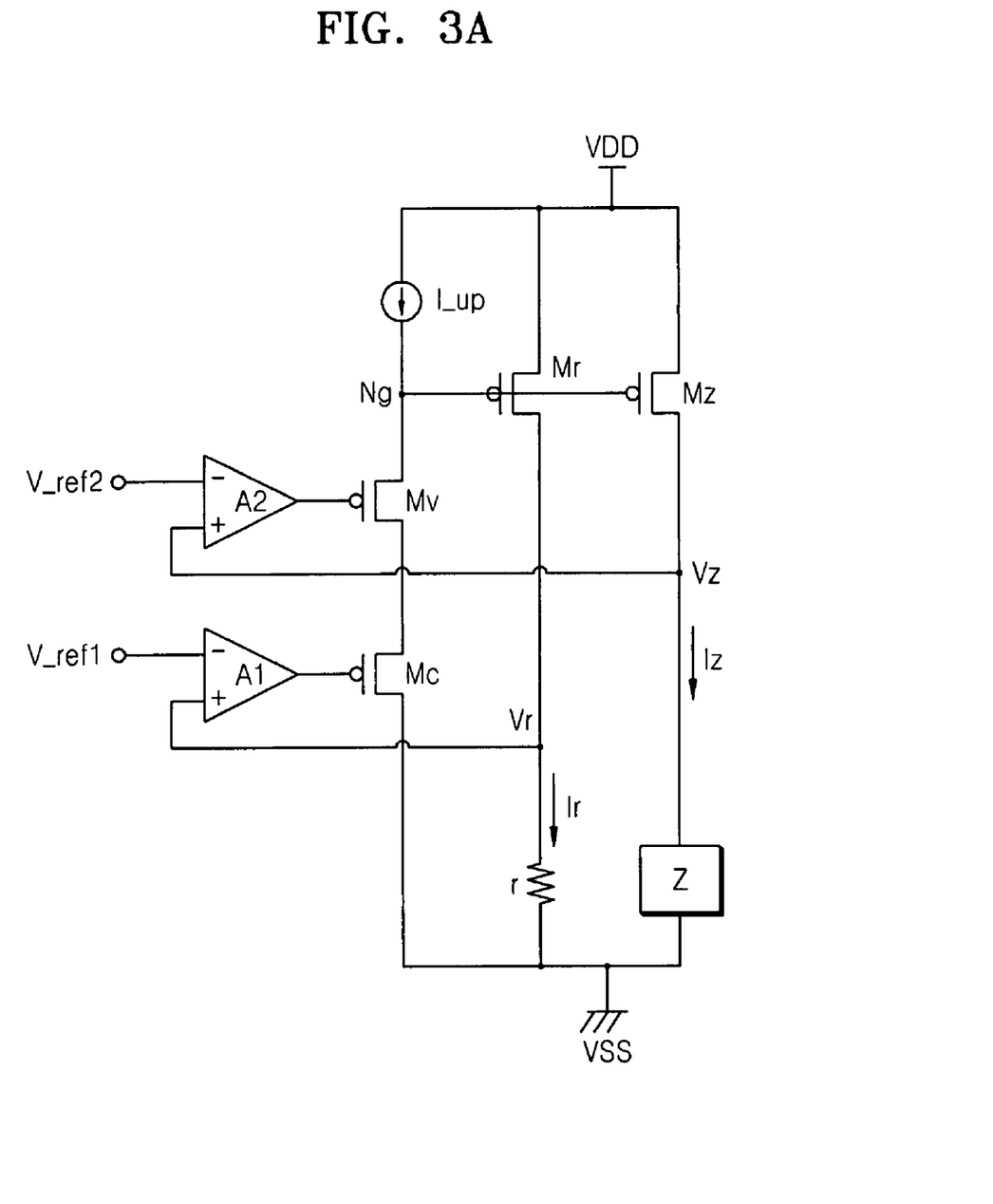
FIGS. 3A, 3B, and 3C are circuit diagrams of charging controllers using a pull-up current source, according to embodiments of the present invention.
Figure 3B:
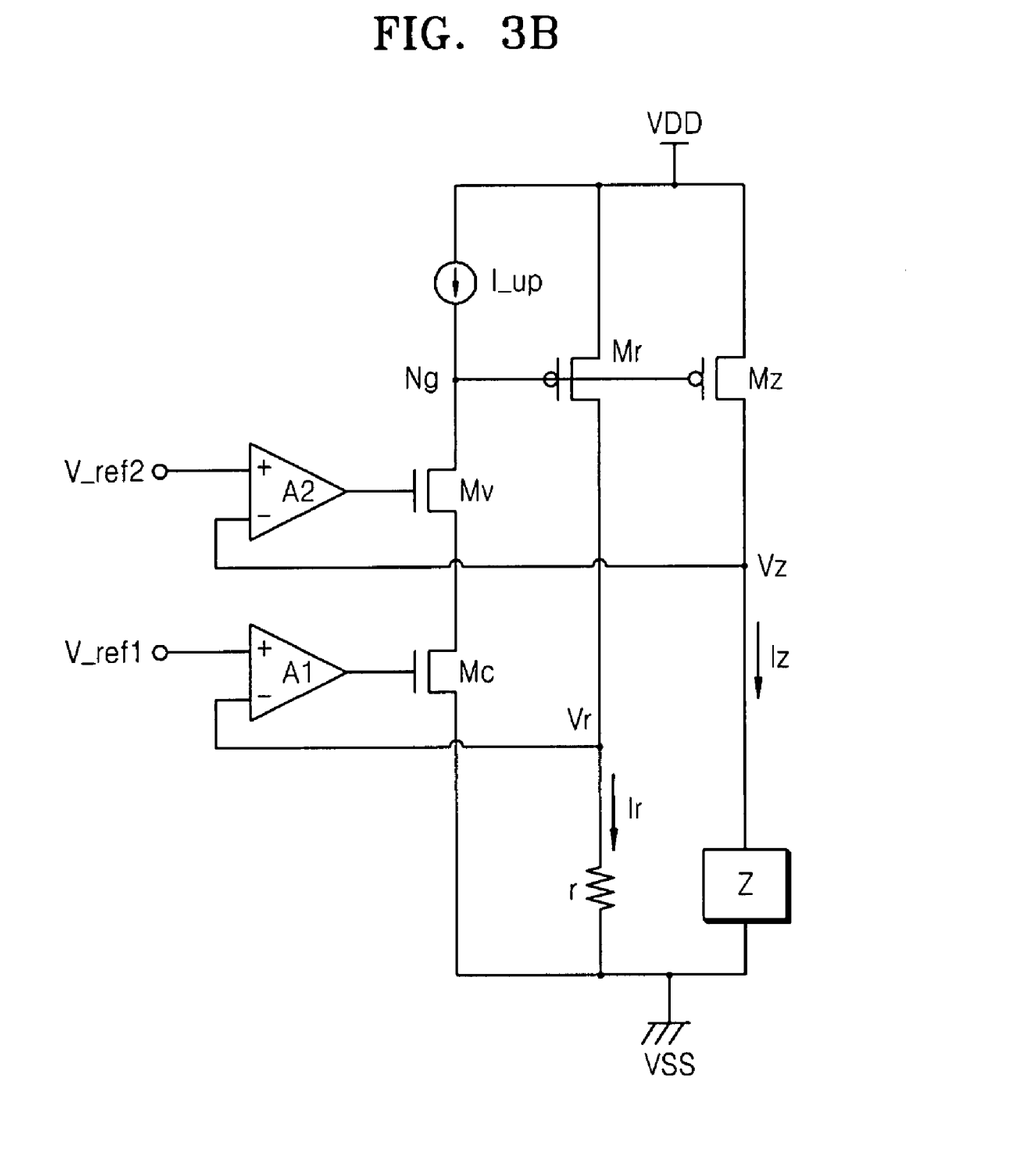
Figure 3C:
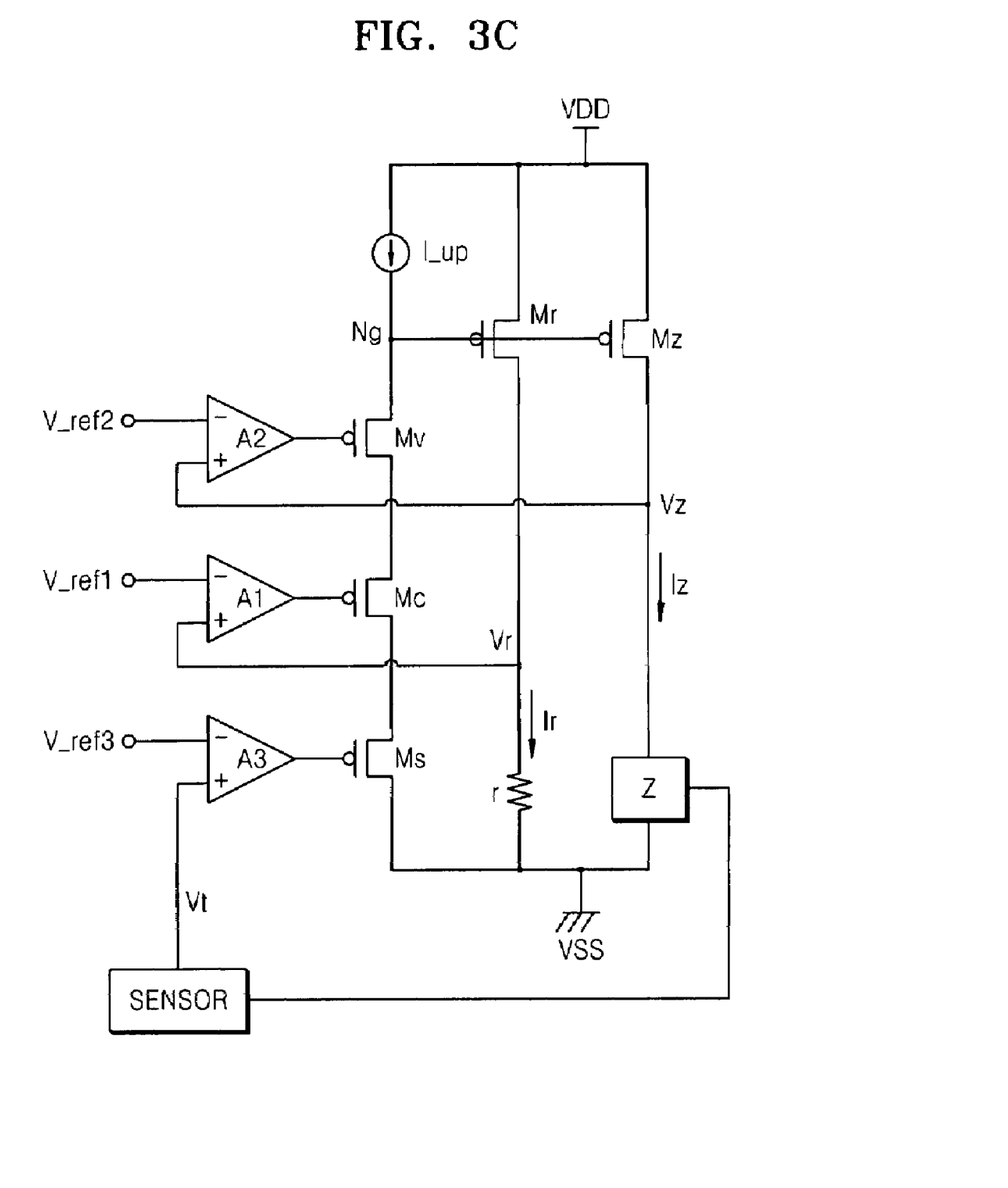

FIGS. 3A, 3B, and 3C show circuit diagrams with each illustrating a respective charging controller according to embodiments of the present invention. Each of the charging controllers of FIGS. 3A, 3B, and 3C includes first and second power transistors Mz and Mr, a device Z (such as a battery for example) that is to be charged, a programmable resistor r as an example reference device, a pull-up current source I_up, a first amplifier A1, a second amplifier A2, a first control transistor Mc, and a second control transistor Mv. The first and second control transistors Mc and Mv are example feedback controlled devices.

In one embodiment of the present invention, the power transistors Mr and Mz are implemented with PMOSFETs (P-channel metal oxide field effect transistors). However, the present invention may also be practiced with the power transistors Mr and Mz being implemented with NMOSFETs (N-channel metal oxide field effect transistors).

The sources of the first and second power transistor Mz and Mr are coupled to a high voltage supply VDD. The drain of the first power transistor Mz is coupled to the charged device Z, and the drain of the second power transistor Mr is coupled to the resistor r. The gates of the first and second power transistors Mz and Mr are coupled to a control node Ng. The first power transistor Mz provides a charging current Iz to the device Z, and the second power transistor Mr provides a reference current (i.e., a mirror current) Ir to the resistor r. A control voltage generated on the control node Ng determines the respective level of each of the currents Iz and Ir.

The pull-up current source I_up is coupled between the high voltage supply VDD and the control node Ng for providing a charging current to the control node Ng. Thus, the current from the pull-up current source I_up flows from the high voltage supply VDD to the control node Ng.

The first and second control transistors Mc and Mv are implemented with PMOSFETs (P-channel metal oxide field effect transistors) in the embodiment of FIG. 3A. The drain of the first control transistor Mc is coupled to a low voltage supply VSS which may be the ground node. The source of the first control transistor Mc is coupled to the drain of the second control transistor Mv having a source coupled to the control node Ng.

Thus, the first and second control transistors Mv and Mc are coupled in series in the current path of the pull-up current source I_up between the control node Ng and the low voltage supply VSS. Consequently, when any of the first and second control transistors Mv and Mc is turned off, the control node Ng is charged up to the voltage of the high voltage supply VDD such that the power transistors Mr and Mz are completely turned off for preventing increase of the voltage Vz at the device Z after the device Z has been completely charged.

Alternatively, when both of the first and second control transistors Mv and Mc are turned on, the voltage of the low voltage supply VSS is applied on the control node Ng. Generally, a range of voltages from that of the low voltage supply VSS to that of the high voltage supply VDD may be generated at the control node Ng.

The first amplifier A1 amplifies a difference of a first reference voltage V_ref1 and a voltage Vr at the resistor r, and has an output applied at the gate of the first control transistor Mc. The second amplifier A2 amplifies a difference of a second reference voltage V_ref2 and a voltage Vz at the charged device Z, and has an output applied at the gate of the second control transistor Mv.

The charging controllers of FIGS. 3A, 3B, and 3C operate according to an initial constant current mode followed by a constant voltage mode, similarly as illustrated in FIGS. 2A and 2B. Initially in the constant current mode, the charging voltage Vz at the device Z is lower than the second reference voltage V_ref2 such that the second control transistor Mv is turned on. In that case, the first amplifier A1 provides feedback control of the first control transistor Mc such that a reference current Ir flowing through the resistor r is maintained at a constant current level, and such that a constant level of charging current Iz flows through the device Z. The constant current level of Ir during the constant current mode is determined by the first reference voltage V_ref1.

That is, in the constant current mode, the voltage Vr at the resistor r which indicates the level of the charging current Iz is feedback controlled such that the voltage Vr is maintained at the first reference voltage V_ref1. When the voltage Vr decreases below the first reference voltage V_ref1, the voltage at the control node Ng is decreased for increasing the reference current Ir and the charging current Iz. Alternatively when the voltage Vr increases above the first reference voltage V_ref1, the voltage at the control node Ng is increased to decrease the reference current Ir and the charging current Iz. With such feedback control, the charging current Iz for charging the device Z is maintained at a substantially constant level during the constant current mode.

Once the voltage Vz at the device Z reaches the second reference voltage V_ref2, the constant voltage mode is entered. In the constant voltage mode, the charging current Iz and the reference current Ir slowly decrease, and the voltage Vr at the resistor r becomes lower than the first reference voltage V_ref1. In that case, the first control transistor Mc is turned on.

When the charging voltage Vz reaches the level of the second reference voltage V_ref2, the second amplifier A2 provides feedback control of the second control transistor Mv for maintaining the charging voltage Vz at the second reference voltage V_ref2. When the charging voltage Vz decreases below the second reference voltage V_ref2, the voltage at the control node Ng is decreased to increase the reference current Ir and the charging current Iz. Alternatively when the charging voltage Vz is increased above the second reference voltage V_ref2, the voltage at the control node Ng is increased to decrease the reference current Ir and the charging current Iz. With such feedback control, the charging voltage Vz is maintained substantially at the second reference voltage V_ref2 during the constant voltage mode.

In FIG. 3A, since the first and second control transistors Mc and Mv are PMOSFETs, the voltage Vr at the resistor r is input to a positive terminal + of the first amplifier A1, and the first reference voltage V_ref1 is input to a negative terminal − of the first amplifier. Similarly in FIG. 3A, the charging voltage Vz is input a positive terminal + of the second amplifier A2, and the second reference voltage V_ref2 is input into a negative terminal − of the second amplifier A2.

The charging controller of FIG. 3B operates similarly to the charging controller of FIG. 3A. However in FIG. 3B, the first and second control transistor Mc and Mv are NMOS-FETs (N-channel metal oxide field effect transistors). In that case, the control transistors Mc and Mv are coupled in series between the control node Ng and the low voltage supply VSS with the source of the first control transistor Mc coupled to the low voltage supply VSS and with the drain of the second control transistor Mv coupled to the control node Ng.

In addition in FIG. 3B, the first reference voltage V_ref1 is input into the positive terminal + of the first amplifier A1, and the voltage Vr at the resistor r is input into the negative terminal − of the first amplifier A1. Similarly, the second reference voltage V_ref2 is input into the positive terminal + of the second amplifier A2, and the charging voltage Vz at the device Z is input into the negative terminal − of the second amplifier A2.

The charging controller of FIG. 3C also operates similarly to the charging controller of FIG. 3A. However, the charging controller of FIG. 3C further includes a temperature sensor SENSOR, a third amplifier A3, and a third control transistor Ms. The temperature sensor SENSOR outputs a device temperature voltage Vt indicating the internal temperature of the device Z. The third amplifier A3 amplifies a difference of a third reference voltage V_ref3 and the device temperature voltage Vt. The output of the third amplifier A3 is applied on the gate of the third control transistor Ms.

The first, second, and third control transistors Mc, Mv, and Ms are coupled in series between the control node Ng and the low voltage supply VSS. If the device temperature voltage Vt becomes higher than the third reference voltage V_ref3, the third control transistor Ms is turned off such that the control node Ng is charged up to voltage of the high voltage supply VDD for turning off the power transistors Mr and Mz.

Generally, the third amplifier A3 controls the third control transistor Ms such that the internal temperature of the device Z does not increase higher than a reference temperature corresponding to the third reference voltage V_ref3. In other words, when the device temperature voltage Vt increases higher than the third reference voltage V_ref3, the third amplifier A3 turns off the third control transistor Ms to decrease the charging current Iz such that the charging controller of FIG. 3C is operating in an overheat protection mode.

Figure 4A:
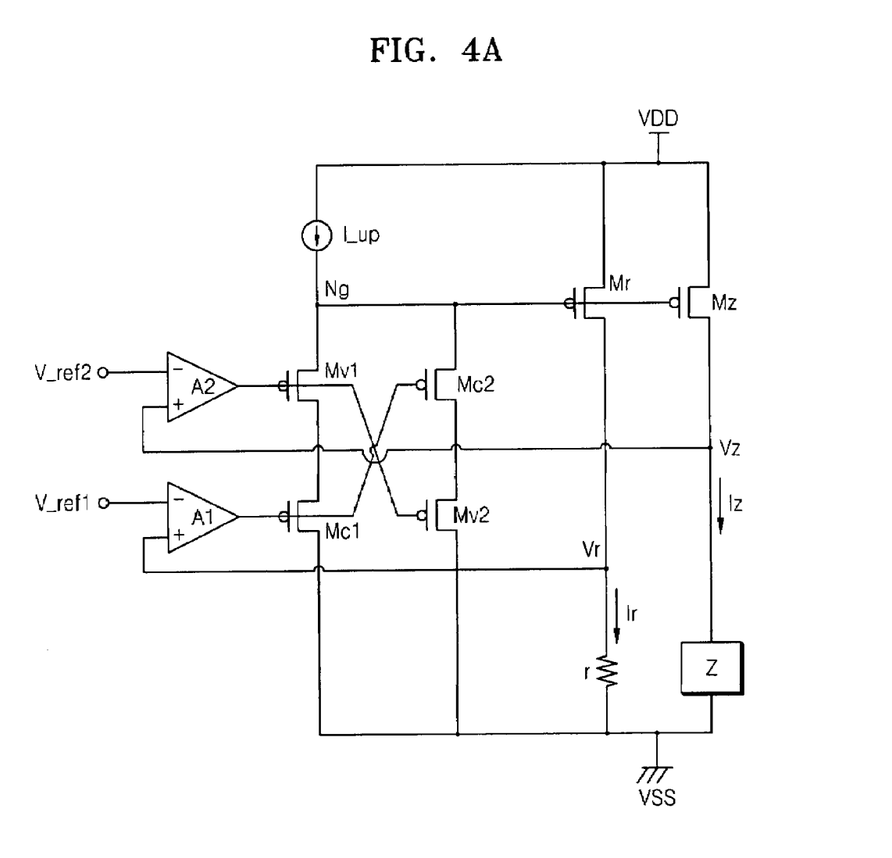
FIGS. 4A, 4B, and 4C are circuit diagrams of charging controllers with control transistors connected in symmetry, according to other embodiments of the present invention.
Figure 4B:
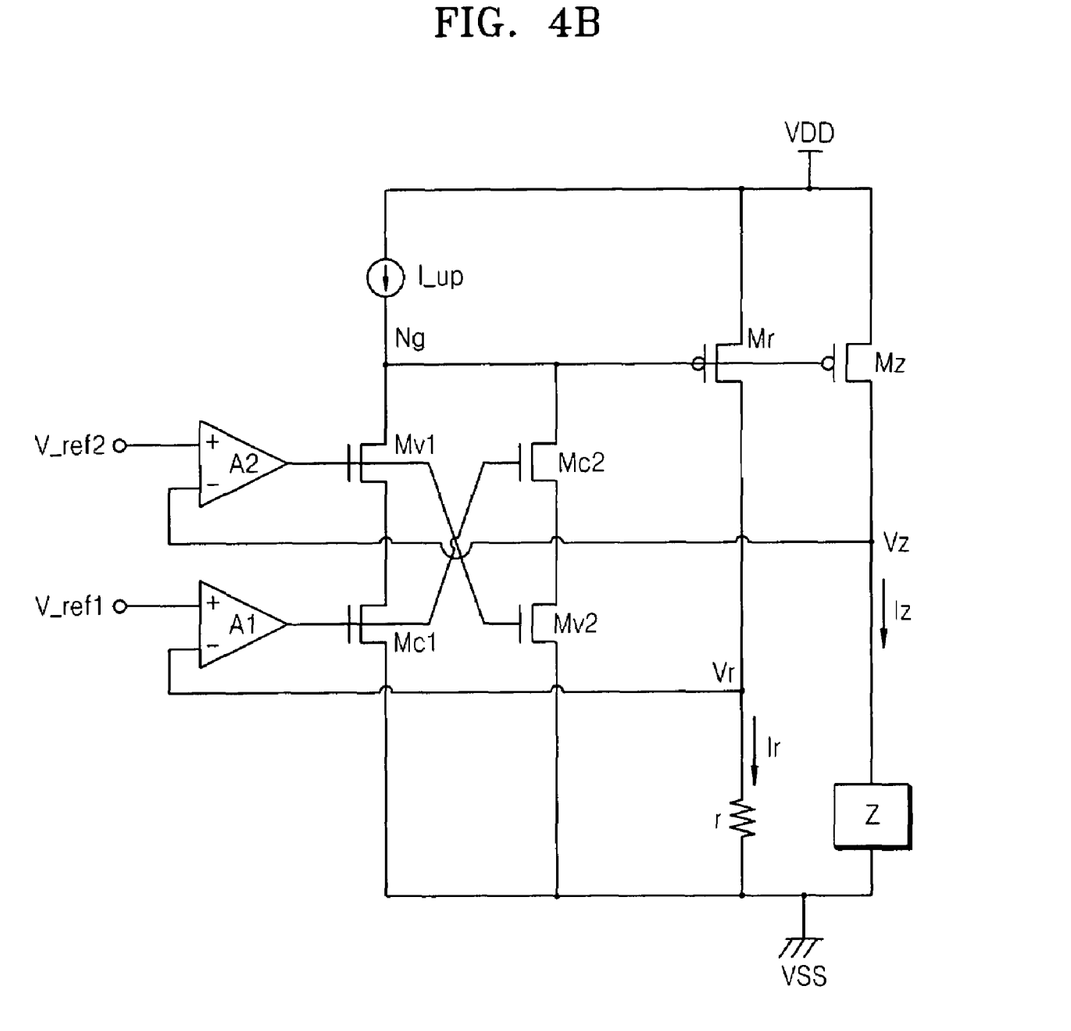
Figure 4C:
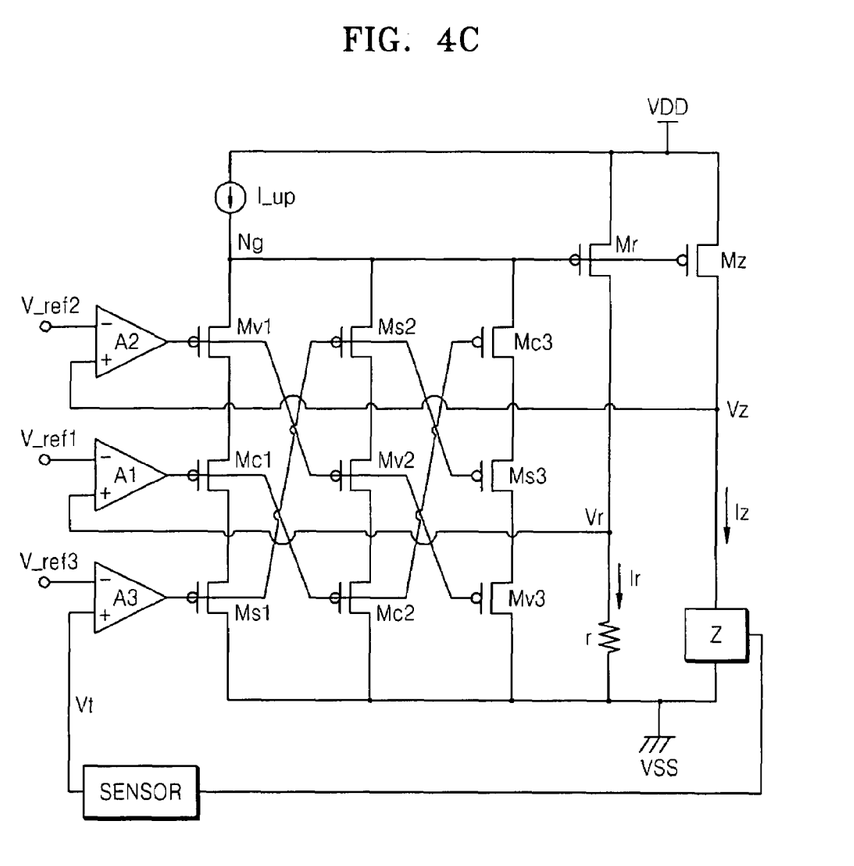

FIGS. 4A, 4B, and 4C are circuit diagrams of charging controllers with control transistors connected in symmetry, according to other embodiments of the present invention. The charging controllers of FIGS. 4A, 4B, and 4C operate similarly to the charging controllers of FIGS. 3A, 3B, and 3C, respectively.

However, referring to FIGS. 3A and 4A, the charging controller of FIG. 4A further includes a series of two additional control PMOSFETs Mc2 and Mv2 in addition to the original control PMOSFETs Mc1 and Mv1 (similar to Mc and Mv in FIG. 3A). Such additional control PMOSFETs Mc2 and Mv2 are coupled in series between the control node Ng and the low voltage supply VSS. Thus, the drain of the control transistor Mv2 is coupled to the low voltage supply VSS, and the source of the control transistor Mv2 is coupled to the drain of the control transistor Mc2 having a source coupled to the control node Ng.

In addition, the gates of the additional control transistors Mv2 and Mc2 are coupled in symmetry with the gates of the original control transistors Mc1 and Mv1. Thus, the gate of control transistor Mv2 is coupled to the gate of control transistor Mv1, and the gate of control transistor Mc2 is coupled to the gate of control transistor Mc1.

Similarly, referring to FIGS. 3B and 4B, the charging controller of FIG. 4B further includes a series of two additional control NMOSFETs Mc2 and Mv2 in addition to the original control NMOSFETs Mc1 and Mv1 (similar to Mc and Mv in FIG. 3B). Such additional control NMOSFETs Mc2 and Mv2 are coupled in symmetry with the original control NMOSFETs Mc1 and Mv1 between the control node Ng and the low voltage supply VSS.

In addition, referring to FIGS. 3C and 4C, the charging controller of FIG. 4C further includes a first series of three additional control PMOSFETs Ms2, Mv2, and Mc2 and a second series of three additional control PMOSFETs Mc3, Ms3, and Mv3, aside from the original control transistors Mv1, Mc1, and Ms1 (similar to Mv, Mc, and Ms in FIG. 3C).

The first series of three additional control PMOSFETs Ms2, Mv2, and Mc2 are coupled in series between the control node Ng and the low voltage supply VSS. Thus, the drain of Mc2 is coupled to the low voltage supply VSS, and the source of Mc2 is coupled to a drain of Mv2 having a source coupled to the drain of Ms2. The source of Ms2 is coupled to the control node Ng.

The second series of three additional control PMOSFETs Mc3, Ms3, and Mv3 are coupled in series between the control node Ng and the low voltage supply VSS. Thus, the drain of Mv3 is coupled to the low voltage supply VSS, and the source of Mv3 is coupled to a drain of Ms3 having a source coupled to the drain of Mc3. The source of Mc3 is coupled to the control node Ng.

The gates of the additional control transistors Ms2, Mv2, Mc2, Mc3, Ms3, and Mv3 are coupled in symmetry with the gates of the original control transistors Mv1, Mc1, and Ms1. Thus, the gates of control transistors Mc1, Mc2, and Mc3 are coupled together to the output of the first amplifier A1. The gates of control transistors Mv1, Mv2, and Mv3 are coupled together to the output of the second amplifier A2. The gates of control transistors Ms1, Ms2, and Ms3 are coupled together to the output of the third amplifier A3.

In FIGS. 3A, 3B, and 3C, the control transistors, Mc, Mv, and Ms are not configured symmetrically such that properties of the feedback loops formed by the amplifiers A1, A2, and A3 may be different. In contrast, in FIGS. 4A, 4B, and 4C, the respective sets of control transistors Mc1, Mc2, Mc3, Mv1, Mv2, Mv3, Ms1, Ms2, and/or Ms3 are configured symmetrically with matched loading such that properties of the feedback loops formed by the amplifiers A1, A2, and A3 are more consistent.

Figure 5A:
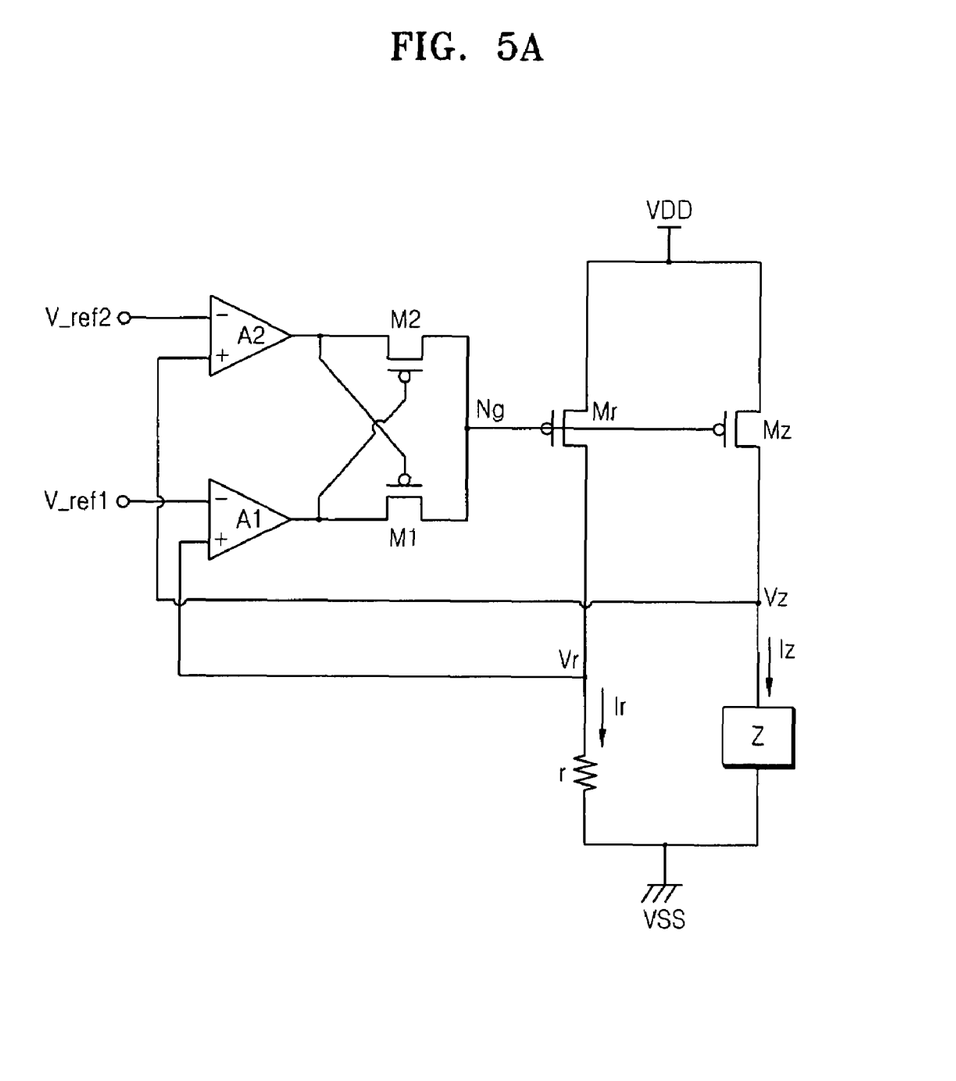
FIGS. 5A, 5B, and 6 are circuit diagrams of charging controllers that do not use pull-up and pull-down current sources to a control node, according to other embodiments of the present invention.
Figure 5B:
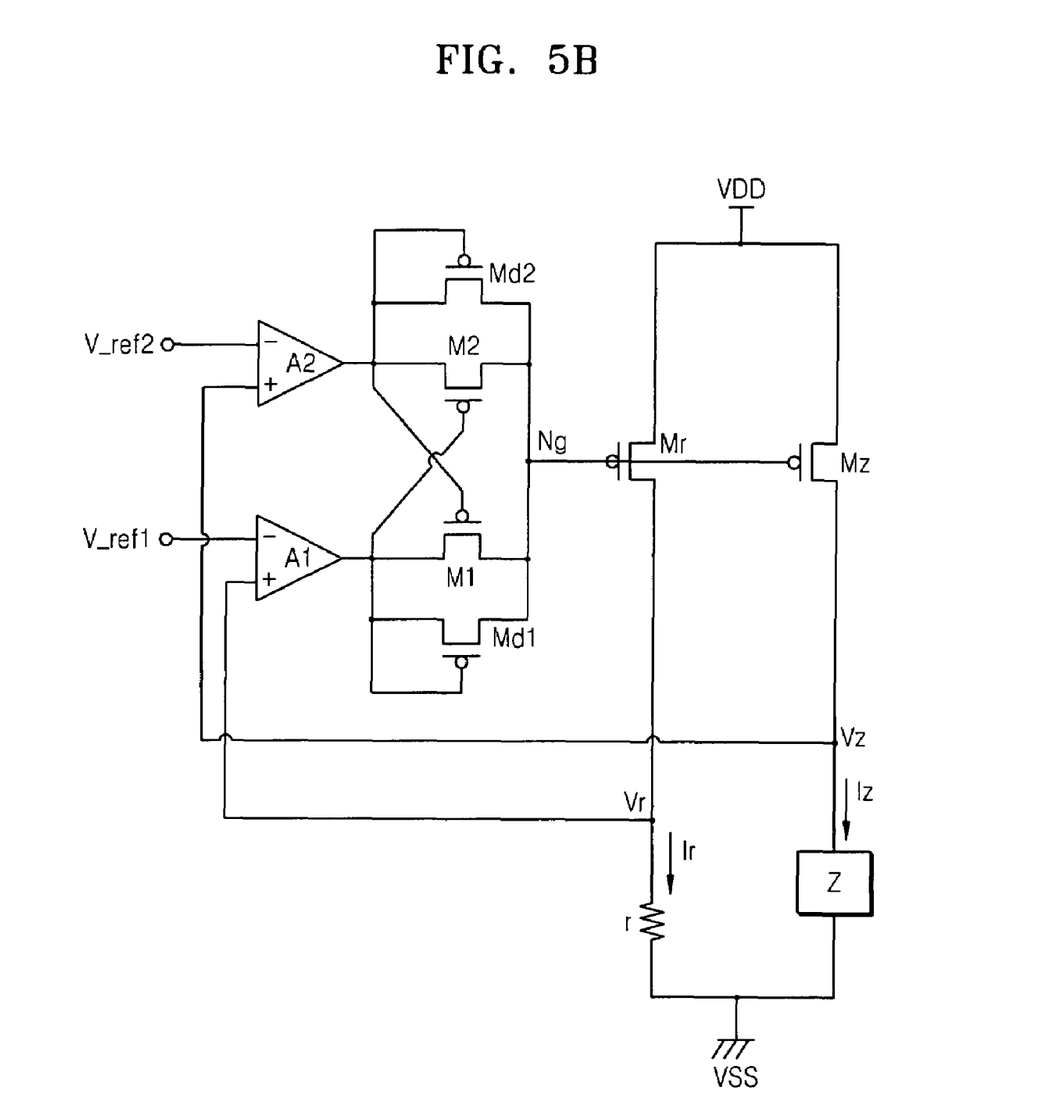
Figure 6:
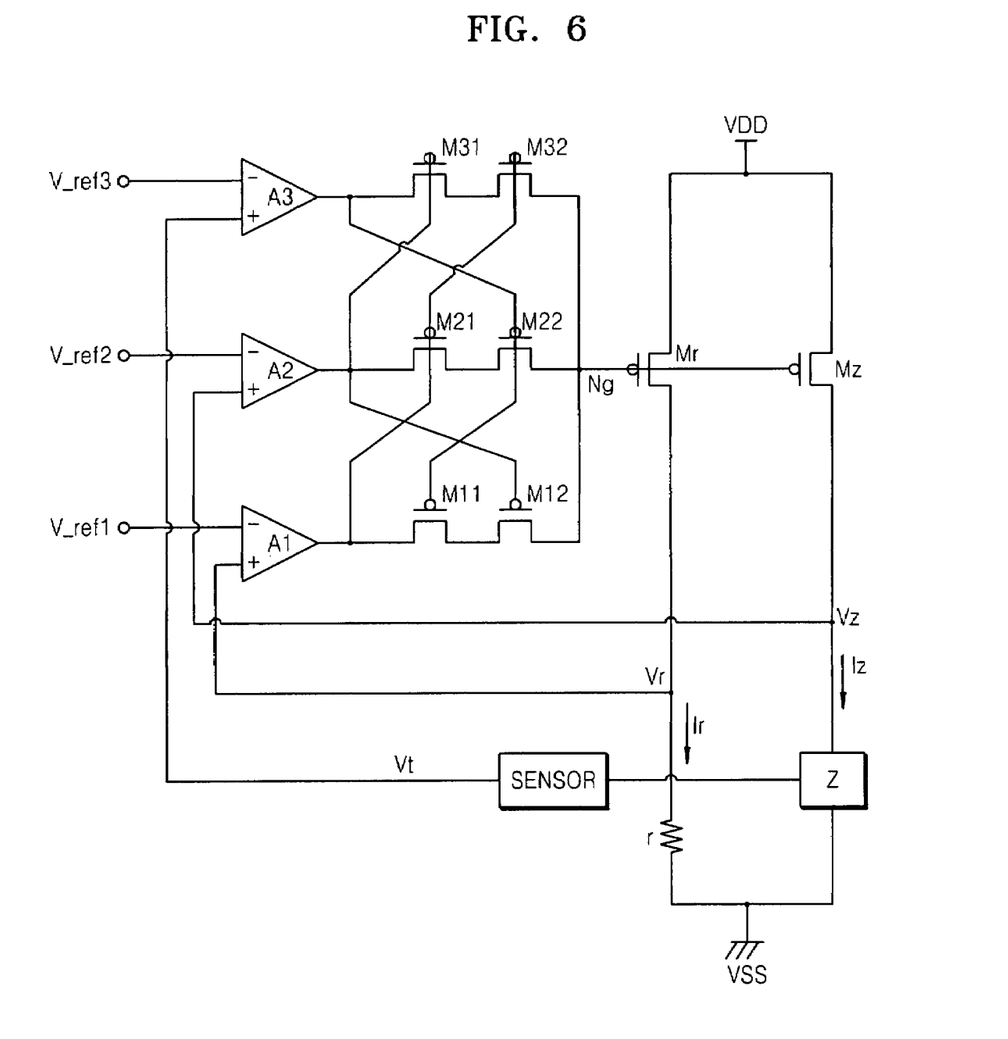

FIGS. 5A, 5B, and 6 are circuit diagrams of charging controllers that do not use pull-up and pull-down current sources to the control node Ng, according to other embodiments of the present invention. The charging controller of FIG. 5A includes first and second power transistors Mz and Mr, a device Z that is to be charged, a programmable resistor r, a first amplifier A1, a second amplifier A2, a first transfer transistor M1, and a second transfer transistor M2.

The sources of the first and second power transistor Mz and Mr are coupled to a high voltage supply VDD. The drain of the first power transistor Mz is coupled to the charged device Z, and the drain of the second power transistor Mr is coupled to the resistor r. The gates of the first and second power transistors Mz and Mr are coupled to a control node Ng.

The first power transistor Mz provides a charging current Iz to the device Z coupled between the first power transistor Mz and a low voltage supply VSS which may be the ground node. The second power transistor Mr provides a reference current which is also a mirror current Ir to the resistor r coupled between the second power transistor Mr and the low voltage supply VSS.

The first amplifier A1 amplifies a first difference of a first reference voltage V_ref1 and a voltage Vr at the resistor r. The voltage Vr corresponds to the charging current Iz to the device Z. The output of the first amplifier A1 is applied on a gate (i.e., a control terminal) of the second transfer transistor M2 that is coupled between the output of the second amplifier A2 and the control node Ng.

The second amplifier A2 amplifies a difference of a second reference voltage V_ref2 and a charging voltage Vz at the device Z. The output of the second amplifier A2 is applied at a gate (i.e., a control terminal) of the first transfer transistor M1 that is coupled between the output of the first amplifier A1 and the control node Ng. Thus, the first transfer transistor M1 transfers the output of the first amplifier A1 to the control node Ng in response to the output of the second amplifier A2. The second transfer transistor M2 transfers the output of the second amplifier A2 to the control node Ng in response to the output of the first amplifier A1.

Initially in the constant current mode, the first transfer transistor M1 is turned on since the charging voltage Vz has not yet reached the level of a second reference voltage V_ref2. In that case, the output of the first amplifier A1 is transferred to the control node Ng via the first transfer transistor M for feedback maintenance of the charging current Iz at a constant current level determined by the first reference voltage V_ref1 during the constant current mode.

In the constant voltage mode, the charging current Iz slowly decreases, and thus the voltage Vr corresponding to the charging current Iz decreases lower than the first reference voltage V_ref1. Accordingly, the second transfer transistor M2 is turned on. In that case, the output of the second amplifier A2 is transferred to the control node Ng via the second transfer transistor M2. The second amplifier A2 provides feedback control for maintaining the charging voltage Vz at the second reference voltage V_ref2 during the constant voltage mode.

The charging controller of FIG. 5B operates similarly to the charging controller of FIG. 5A. However, the charging controller of FIG. 5B further includes a first diode-connected transistor Md1 and a second diode-connected transistor Md2. The first diode-connected transistor Md1 is a PMOSFET having a drain and gate connected together at the output of the first amplifier A1 and having a source coupled to the control node Ng. The second diode-connected transistor Md2 is a PMOSFET having a drain and gate connected together at the output of the second amplifier A2 and having a source coupled to the control node Ng.

The diode-connected transistors Md1 and Md2 form a respective resistor across each of the transfer transistors M1 and M2, respectively, for improving operation of the charging controller when the outputs of the first and second amplifiers A1 and A2 are similar. That is, when the outputs of the first and second amplifiers A1 and A2 are similar, the turning on and off of the first and second transfer transistors M1 and M2 may be difficult to predict. Accordingly in that case, the voltage at the control node Ng is difficult to control. With a respective resistance across each of the transfer transistors M1 and M2 from the additional diode-connected transistors Md1 and Md2, the voltage at the control node Ng may be more easily predicted and controlled even when the outputs of the first and second amplifiers A1 and A2 are similar.

FIG. 6 is a circuit diagram of a charging controller that does not use pull-up and pull-down current sources according to another embodiment of the present invention. The charging controller of FIG. 6 operates similarly to the charging controller of FIG. 5A with elements having the same reference number in FIGS. 5A and 6 referring to elements having similar structure and/or function.

However, the charging controller of FIG. 6 further includes a temperature sensor SENSOR, a third amplifier A3, a first transfer transistor M11, a second transfer transistor M21, a third transfer transistor M31, a fourth transfer transistor M32, a fifth transfer transistor M12, and a sixth transfer transistor M22. The SENSOR generates a device temperature voltage Vt indicating the internal temperature of the device Z. The third amplifier A3 amplifies a difference between a third reference voltage V_ref3 and the device temperature voltage Vt. The third and fourth transfer transistors M31 and M32 are turned on for coupling the output of the third amplifier A3 to the control node Ng for limiting the voltage Vz at the device Z during the overheat protection mode.

The first transfer transistor M11 and the fifth transfer transistor M12 are coupled in series between the output of the first amplifier A1 and the control node Ng. The gate of the first transfer transistor M11 is coupled to the output of the third amplifier A3, and the gate of the fifth transfer transistor M12 is coupled to the output of the second amplifier A2.

Thus, the first and fifth transfer transistors M11 and M12 are turned on or off in response to the outputs of the second and third amplifiers A2 and A3. In the constant current mode, the output of the first amplifier A1 is transferred to the control node Ng via the first and fifth transfer transistors M11 and M12 that are turned on by the outputs of the second and third amplifiers A2 and A3. The voltage at the control node Ng is feedback controlled via the first amplifier A1 for maintaining the charging current Iz at a constant current level determined by the first reference voltage V_ref1 during the constant current mode.

The second and sixth transfer transistors M21 and M22 are coupled in series between the output of the second amplifier A2 and the control node Ng. The gate of the second transfer transistor M21 is coupled to the output of the first amplifier A1, and the gate of the sixth transfer transistor M22 is coupled to the output of the third amplifier A3.

Thus, the second and sixth transfer transistors M21 and M22 are turned on or off in response to the outputs of the first and third amplifiers A1 and A3. In the constant voltage mode, the output of the second amplifier A2 is transferred to the control node Ng via the second and sixth transfer transistors M21 and M22 that are turned on by the outputs of the first and third amplifiers A1 and A3. The voltage at the control node Ng is feedback controlled via the second amplifier A2 for maintaining the voltage Vz at the device Z at the level of the second reference voltage V_ref2 during the constant voltage mode.

The third and fourth transfer transistors M31 and M32 are coupled in series between the output of the third amplifier A3 and the control node Ng. The gate of the third transfer transistor M31 is coupled to the output of the second amplifier A2, and the gate of the fourth transfer transistor M32 is coupled to the output of the first amplifier A1.

Thus, the third and fourth transfer transistors M31 and M32 are turned on or off in response to the outputs of the first and second amplifiers A1 and A2. In the overheat protection mode, the output of the third amplifier A3 is transferred to the control node Ng via the third and fourth transfer transistors M31 and M32 that are turned on by the outputs of the first and second amplifiers A1 and A2. The voltage at the control node Ng is feedback controlled via the third amplifier A3 for maintaining the temperature at the device Z below the level represented by the third reference voltage V_ref3 during the overheat protection mode.

In this manner, a pull-down current source coupled to the control node Ng is not used. Thus, the control node Ng is not discharged to a low voltage such that the power transistors Mz and Mr are not undesirably turned on after charging of the device Z is complete. Thus, the voltage Vz at the device Z is not increased undesirably such that damage to the device Z may be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

For example, any types and numbers of elements as described and illustrated herein are by way of examples only.

The present invention is limited only as defined in the following claims and equivalents thereof.

What is claimed is:

1. A charging controller comprising:
   a control node having a control voltage generated thereon for controlling a first current to a charged device and a second current to a reference device;
   a pull-up current source that provides a charging current to the control node;
   a first feed-back controlled device coupled in a current path of the pull-up current source through the control node for maintaining the second current at a constant current level during a constant current mode; and
   a second feed-back controlled device coupled in the current path of the pull-up current source through the control node for maintaining a voltage of the charged device at a constant voltage level during a constant voltage mode.

2. The charging controller of claim 1, wherein the pull-up current source and the first and second feed-back controlled devices are connected in series between a high voltage supply and a low voltage supply.

3. The charging controller of claim 2, wherein the pull-up current source is coupled between the high voltage supply and the control node, and wherein the first and second feed-back controlled devices are connected in series between the control node and the low voltage supply.

4. The charging controller of claim 3, further comprising:
   a first power transistor coupled between the high voltage supply and the charged device, and having a gate coupled to the control node for providing the first current to the charged device; and
   a second power transistor coupled between the high voltage supply and the reference device, and having a gate coupled to the control node for providing the second current to the reference device.

5. The charging controller of claim 3, wherein the first and second feed-back controlled devices are first and second control transistors coupled in series between the control node and the low voltage supply.

6. The charging controller of claim 5, further comprising:
   a first amplifier for amplifying a difference of a first reference voltage and a voltage at the reference device, with an output of the first amplifier being applied on a gate of the first control transistor; and
   a second amplifier for amplifying a difference of a second reference voltage and a voltage at the charged device, with an output of the second amplifier being applied on a gate of the second control transistor.

7. The charging controller of claim 6, wherein each of the first and second control transistors is a respective PMOSFET (P-channel metal oxide semiconductor field effect transistor).

8. The charging controller of claim 6, wherein each of the first and second control transistors is a respective NMOSFET (N-channel metal oxide semiconductor field effect transistor).

9. The charging controller of claim 6, further comprising:
   two additional control transistors coupled in series between the control node and the low voltage supply and coupled symmetrically to the gates of the first and second control transistors.

10. The charging controller of claim 1, further comprising:
    a third feed-back controlled device coupled in the current path of the pull-up current source through the control node for limiting a temperature at the charged device.

11. The charging controller of claim 10, wherein the first, second, and third feed-back controlled devices are first, second, and third control transistors coupled in series between the control node and a low voltage supply, and wherein the pull-up current source is coupled between a high voltage supply and the control node.

12. The charging controller of claim 11, further comprising:
    a first amplifier for amplifying a difference of a first reference voltage and a voltage at the reference device, with an output of the first amplifier being applied on a gate of the first control transistor;
    a second amplifier for amplifying a difference of a second reference voltage and a voltage at the charged device, with an output of the second amplifier being applied on a gate of the second control transistor; and
    a third amplifier for amplifying a difference of a third reference voltage and a voltage from a temperature sensor for indicating a temperature at the charged device, with an output of the third amplifier being applied on a gate of the third control transistor.

13. The charging controller of claim 12, further comprising:
    a first series of three additional control transistors coupled between the control node and the low voltage supply; and
    a second series of three additional control transistors coupled between the control node and the low voltage supply;
    wherein the first and second series of the additional control transistors are coupled symmetrically to the gates of the first, second, and third control transistors.

14. The charging controller of claim 1, wherein the charged device is a battery, and wherein the reference device is a resistor.

15. A charging controller comprising:
    a control node having a control voltage generated thereon for controlling a first current to a charged device and a second current to a reference device;
    a first amplifier for amplifying a difference of a first reference voltage and a voltage at the reference device;
    a second amplifier for amplifying a difference of a second reference voltage and a voltage at the charged device;
    a first transfer transistor that transfers an output of the first amplifier to the control node in response to an output of the second amplifier; and
    a second transfer transistor that transfers the output of the second amplifier to the control node in response to the output of the first amplifier.

16. The charging controller of claim 15, wherein the first transfer transistor has a controlled terminal coupled to the output of the second amplifier that turns the first transfer transistor on for maintaining the second current at a constant current level during a constant current mode,
    and wherein the second transfer transistor has a controlled terminal coupled to the output of the first amplifier that turns the second transfer transistor on for maintaining a voltage of the charged device at a constant voltage level during a constant voltage mode.

17. The charging controller of claim 15, wherein the first and second transfer transistors are PMOSFETs (P-channel metal oxide semiconductor field effect transistors), and wherein a gate of the first transfer transistor is coupled to an output of the second amplifier, and wherein a gate of the second transfer transistor is coupled to an output of the first amplifier.

18. The charging controller of claim 15, further comprising:
   a first diode-connected field effect transistor coupled between the output of the first amplifier and the control node; and
   a second diode-connected field effect transistor coupled between the output of the second amplifier and the control node.

19. The charging controller of claim 15, further comprising:
   a third amplifier for amplifying a difference of a third reference voltage and a voltage from a temperature sensor for indicating a temperature at the charged device;
   third and fourth transfer transistors coupled in series between an output of the third amplifier and the control node,
   wherein the third and fourth transfer transistors transfer the output of the third amplifier to the control node in response to the outputs of the first and second amplifiers;
   a fifth transfer transistor coupled in series with the first transfer transistor between the output of the first amplifier and the control node,
   wherein the first and fifth transfer transistors transfer the output of the first amplifier to the control node in response to the outputs of the second and third amplifiers; and
   a sixth transfer transistor coupled in series with the second transfer transistor between the output of the second amplifier and the control node,
   wherein the second and sixth transfer transistors transfer the output of the second amplifier to the control node in response to the outputs of the first and third amplifiers.

20. The charging controller of claim 15, further comprising:
   a first power transistor coupled between a high voltage supply and the charged device, and having a gate coupled to the control node for providing the first current to the charged device; and
   a second power transistor coupled between the high voltage supply and the reference device, and having a gate coupled to the control node for providing the second current to the reference device.

21. The charging controller of claim 15, wherein the charged device is a battery, and wherein the reference device is a resistor.

* * * * *